(12) United States Patent
Yamane et al.

(10) Patent No.: US 8,921,482 B2
(45) Date of Patent: Dec. 30, 2014

(54) WATER REPELLENT COMPOSITION, ITS PRODUCTION METHOD, HYDROPHOBIC SUBSTRATE TREATING AGENT COMPOSITION AND ARTICLE

(71) Applicant: Asahi Glass Company, Limited, Chiyoda-ku (JP)

(72) Inventors: Shin Yamane, Chiyoda-ku (JP); Shuichiro Sugimoto, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 13/764,163

(22) Filed: Feb. 11, 2013

(65) Prior Publication Data

US 2013/0149543 A1 Jun. 13, 2013

Related U.S. Application Data

(63) Continuation of application No. PCT/JP2011/068078, filed on Aug. 8, 2011.

(30) Foreign Application Priority Data

Aug. 11, 2010 (JP) ................................. 2010-180244

(51) Int. Cl.
*C08F 2/32* (2006.01)
(52) U.S. Cl.
USPC ............ 524/755; 524/765; 524/773; 524/801
(58) Field of Classification Search
USPC ................................ 524/755, 765, 773, 801
See application file for complete search history.

(56) References Cited

U.S. PATENT DOCUMENTS

| 5,688,309 A | * | 11/1997 | Shimada et al. | 106/2 |
| 5,876,617 A | * | 3/1999 | Sato et al. | 252/8.62 |
| 7,989,567 B2 | * | 8/2011 | Sugiyama et al. | 526/224 |

FOREIGN PATENT DOCUMENTS

| EP | 1298180 A1 * | 4/2003 |
| JP | 2010-501656 | 1/2010 |
| WO | 2004/035708 | 4/2004 |
| WO | 2008/076161 | 6/2008 |
| WO | 2009/034773 | 3/2009 |
| WO | 2009/104728 | 8/2009 |

OTHER PUBLICATIONS

International Search Report issued Sep. 6, 2011 in PCT/JP2011/068078 filed Aug. 8, 2011.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide a water repellent composition which is capable of imparting sufficient water repellency and alcohol repellency to a hydrophobic substrate without significantly decreasing the antistatic property imparted to the hydrophobic substrate by an antistatic agent, and which presents a low environmental impact, its production method, a hydrophobic substrate treating agent composition and an article. A water repellent composition having a fluorinated copolymer having structural units based on a monomer (a) having a $C_{1-6}$ polyfluoroalkyl group, structural units based on a monomer (b) having a $C_{1-6}$ alkyl group and structural units based on a monomer (c) (halogenated olefin), and a medium, where the proportion of the structural units based on the monomer (a) is from 50 to 90 mass % of the structural units (100 mass %) based on all the monomers.

13 Claims, No Drawings

WATER REPELLENT COMPOSITION, ITS PRODUCTION METHOD, HYDROPHOBIC SUBSTRATE TREATING AGENT COMPOSITION AND ARTICLE

TECHNICAL FIELD

The present invention relates to a water repellent composition, its production method, a hydrophobic substrate treating agent composition, and an article comprising a hydrophobic substrate treated with a hydrophobic substrate treating agent composition.

BACKGROUND ART

For medial gowns which require water repellency, a hydrophobic substrate such as a polypropylene nonwoven fabric is used. Further, medical gowns also require the antistatic property and the alcohol repellency. Accordingly, in order to impart the alcohol repellency, a hydrophobic substrate is treated with a fluorinated water repellent containing a fluorinated copolymer. Further, in order to impart the antistatic property, the hydrophobic substrate is treated with an antistatic agent. Further, as the antistatic agent is hydrophilic, the water repellency of the hydrophobic substrate itself is lowered when treated with the antistatic agent, and the decrease in the water repellency is suppressed by the fluorinated water repellent used in combination.

Recently, EPA (US Environmental Protection Agency) has pointed out that a compound having a perfluoroalkyl group (a perfluoroalkyl group will be hereinafter referred to as a $R^F$ group) having at least 8 carbon atoms is likely to be decomposed in the environment or in vivo, and the decomposition product is likely to be accumulated, i.e. it presents a high environmental impact. Therefore, a fluorinated copolymer for a water repellent composition, which has an $R^F$ group having at most 6 carbon atoms and having no $R^F$ group having at least 8 carbon atoms has been required.

As a water/oil repellent composition containing such a fluorinated copolymer, the following water repellent composition has been, for example, proposed.

A water repellent composition comprising a fluorinated copolymer having structural units based on a (meth)acrylate having a $C_6$ $R^F$ group, structural units based on a (meth)acrylate having a $C_{8-40}$ alkyl group and structural units based on vinylidene chloride (Patent Document 1).

PRIOR ART DOCUMENT

Patent Document

Patent Document 1: WO2008/076161

DISCLOSURE OF INVENTION

Technical Problem

With respect to the fluorinated copolymer, the water repellency and the alcohol repellency which are lowered by replacing the $R^F$ group having at least 8 carbon atoms with a $C_6$ $R^F$ group are compensated with a long chain alkyl group having at least 8 carbon atoms. However, a fluorinated copolymer having a long chain alkyl group having at least 8 carbon atoms tends to lower the antistatic property imparted to a hydrophobic substrate by the antistatic agent. Accordingly, it is necessary to increase the amount of the antistatic agent to be used for treatment of the hydrophobic substrate.

However, if the amount of the antistatic agent is increased, hydrophilicity of the hydrophobic substrate tends to be high, and not only the water repellency but also the alcohol repellency of the hydrophobic substrate may be lowered.

The present invention provides a water repellent composition which is capable of imparting sufficient water repellency and alcohol repellency to a hydrophobic substrate without inhibiting the antistatic property imparted to the hydrophobic substrate by the antistatic agent, and which presents a low environmental impact, a method for producing it, a hydrophobic substrate treating agent composition and an article.

Solution to Problem

The water repellent composition of the present invention is a water repellent composition to be used for treatment of a hydrophobic substrate, which comprises a fluorinated copolymer having structural units based on the following monomer (a), structural units based on the following monomer (b) and structural units based on the following monomer (c), and a medium, wherein the proportion of the structural units based on the monomer (a) is from 50 to 90 mass % of the structural units (100 mass %) based on all the monomers:

monomer (a): a compound represented by the following formula (1):

$$(Z-Y)_n X \tag{1}$$

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

wherein i is an integer of from 1 to 6, j is an integer of from 0 to 10, and each of $X^1$ and $X^2$ is a fluorine atom or a trifluoromethyl group;

wherein R is a hydrogen atom, a methyl group or a halogen atom, and φ is a phenylene group;

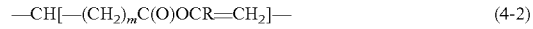

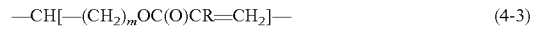

where R is a hydrogen atom, a methyl group or a halogen atom, and m is an integer of from 0 to 4;

monomer (b): a (meth)acrylate having no polyfluoroalkyl group and having a $C_{1-6}$ alkyl group;

monomer (c): a halogenated olefin.

The above fluorinated copolymer preferably further has structural units based on the following monomer (d):

monomer (d): a monomer having no polyfluoroalkyl group and having a crosslinkable functional group.

The method for producing a water repellent composition of the present invention is a method for producing a water repellent composition to be used for treatment of a hydrophobic substrate, which comprises polymerizing the following monomer mixture in a medium in the presence of a surfactant and a polymerization initiator:

monomer mixture: a mixture comprising the monomer (a), the monomer (b) and the monomer (c) in a proportion of the monomer (a) of from 50 to 90 mass % of the monomer mixture (100 mass %).

The monomer mixture preferably further contains the monomer (d).

The hydrophobic substrate treating agent composition of the present invention comprises the water repellent composition of the present invention, a penetrant and an antistatic agent.

The article of the present invention comprises a hydrophobic substrate treated with the hydrophobic substrate treating agent composition of the present invention.

The hydrophobic substrate is preferably a substrate made of a polyolefin.

Advantageous Effects of Invention

The water repellent composition of the present invention is capable of imparting sufficient water repellency and alcohol repellency to a hydrophobic substrate without inhibiting the antistatic property imparted to the hydrophobic substrate by an antistatic agent, and presents a low environmental impact.

According to the method for producing a water repellent composition of the present invention, it is possible to produce a water repellent composition capable of imparting sufficient water repellency and alcohol repellency to a hydrophobic substrate without inhibiting the antistatic property imparted to the hydrophobic substrate by an antistatic agent, and which presents a low environmental impact.

By the hydrophobic substrate treating agent composition of the present invention, both sufficient antistatic property and sufficient water repellency and alcohol repellency can be simultaneously imparted to a hydrophobic substrate, and presents a low environmental impact.

The article of the present invention has sufficient antistatic property, water repellency and alcohol repellency and presents a low environmental impact.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner. Further, a (meth)acrylate in this specification means an acrylate or a methacrylate. Further, in this specification, a monomer means a compound having a polymerizable unsaturated group. Further, in this specification, a $R^f$ group is a group having some or all of hydrogen atoms in an alkyl group substituted by fluorine atoms, and a $R^F$ group is a group having all hydrogen atoms in an alkyl group substituted by fluorine atoms.

<Water Repellent Composition>

The water repellent composition of the present invention comprises a fluorinated copolymer and a medium, as essential components, and may further contain a surfactant or an additive, as the case requires.

(Fluorinated Copolymer)

The fluorinated copolymer is a copolymer which has structural units based on a monomer (a), structural units based on a monomer (b) and structural units based on a monomer (c) and may further have structural units based on a monomer (d) and structural units based on a monomer (e), as the case requires.

Monomer (a):

The monomer (a) is a compound (1). Here, in the formula (1), the boundary between Z and Y is determined so that the number of carbon atoms in Z becomes smallest.

$$(Z-Y)_nX \quad (1)$$

Z is a $C_{1-6}$ $R^f$ group (provided that the $R^f$ group may contain an etheric oxygen atom) or a group (2):

$$C_iF_{2i+1}O(CFX^1CF_2O)_jCFX^2- \quad (2)$$

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $R^F$ group. The $R^f$ group may be linear or branched, preferably linear.

Z may, for example, be the following groups:

$F(CF_2)_4-$,

$F(CF_2)_5-$,

$F(CF_2)_6-$,

$(CF_3)_2CF(CF_2)_2-$,

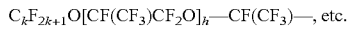

$C_kF_{2k+1}O[CF(CF_3)CF_2O]_h-CF(CF_3)-$, etc.

wherein k is an integer of from 1 to 6, and h is an integer of from 0 to 10.

Y is a bivalent organic group (excluding a polyfluoroalkylene group) or a single bond.

The bivalent organic group is preferably an alkylene group. The alkylene group may be linear or branched. The alkylene group may have $-O-$, $-NH-$, $-CO-$, $-S-$, $-SO_2-$, $-CD^1=CD^2-$ (wherein each of $D^1$ and $D^2$ which are independent of each other, is a hydrogen atom or a methyl group), etc.

Y may, for example, be the following groups.

$-CH_2-$,

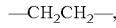

$-CH_2CH_2-$,

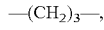

$-(CH_2)_3-$,

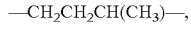

$-CH_2CH_2CH(CH_3)-$,

$-CH=CH-CH_2-$,

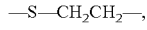

$-S-CH_2CH_2-$,

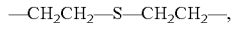

$-CH_2CH_2-S-CH_2CH_2-$,

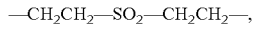

$-CH_2CH_2-SO_2-CH_2CH_2-$,

$-W-OC(O)NH-A-NHC(O)O-(C_pH_{2p})-$, etc.

wherein p is an integer of from 2 to 30.

A is a symmetric alkylene group having no branch, an arylene group or an aralkylene group and is preferably $-C_6H_{12}-$, $-\phi-CH_2-\phi-$ or $-\phi-$ (wherein $\phi$ is a phenylene group).

W is any one of the following groups.

$$-SO_2N(R^1)-C_dH_{2d}-,$$

$$-CONHC_dH_{2d}-,$$

$$-CH(R^{F1})-C_eH_{2e}-,$$

$$-C_qH_{2q}-$$

wherein $R^1$ is a hydrogen atom or a $C_{1-4}$ alkyl group, d is an integer of from 2 to 8, $R^{F1}$ is a $C_{1-20}$ $R^F$ group, e is an integer of from 0 to 6, and q is an integer of from 1 to 20. $R^{F1}$ is preferably a $C_{1-6}$ $R^F$ group, more preferably a $C_4$ or $C_6$ $R^F$ group.

n is 1 or 2.

X is, when n is 1, any one of groups (3-1) to (3-5) and when n is 2, any one of groups (4-1) to (4-4):

$$-CR=CH_2 \quad (3-1)$$

$$-C(O)OCR=CH_2 \quad (3-2)$$

$$-OC(O)CR=CH_2 \quad (3-3)$$

$$-OCH_2-\phi-CR=CH_2 \quad (3-4)$$

$$-OCH=CH_2 \quad (3-5)$$

wherein R is a hydrogen atom, a methyl group or a halogen atom, and $\phi$ is a phenylene group.

$$-CH[-(CH_2)_mCR=CH_2]- \quad (4-1)$$

$$-CH[-(CH_2)_mC(O)OCR=CH_2]- \quad (4-2)$$

$$-CH[-(CH_2)_mOC(O)CR=CH_2]- \quad (4-3)$$

$$-OC(O)CH=CHC(O)O- \quad (4-4)$$

wherein R is a hydrogen atom, a methyl group or a halogen atom, and m is an integer of from 0 to 4.

The compound (1) is preferably a (meth)acrylate having a $C_{4-6}$ $R^F$ group from the viewpoint of e.g. the polymerizability with other monomers, the flexibility of a coating film containing the fluorinated copolymer, the adhesion of the fluorinated copolymer to a hydrophobic substrate, the dispersibility in a medium and efficiency of the emulsion polymerization.

The compound (1) is preferably a compound wherein Z is a $C_{4-6}$ $R^F$ group, Y is a $C_{1-4}$ alkylene group, n is 1, and X is the group (3-3), more preferably a methacrylate having a $C_6$ $R^F$ group.

Monomer (b):

The monomer (b) is a (meth)acrylate having no $R^f$ group and having a $C_{1-6}$ alkyl group.

By having structural units based on the monomer (b), it is possible to reduce the amount of the antistatic agent to be applied to a substrate while maintaining the water repellency and the alcohol repellency. Further, the cost of the fluorinated copolymer can be suppressed.

The monomer (b) is preferably a (meth)acrylate having a $C_{1-4}$ alkyl group, more preferably n-butyl(meth)acrylate.

Monomer (c)

The monomer (c) is a halogenated olefin.

By having structural units based on the monomer (c), the adhesion to a substrate will be improved, and the water repellency and the alcohol repellency will further be improved.

The monomer (c) may, for example, be tetrafluoroethylene, chlorotrifluoroethylene, vinylidene fluoride, vinyl fluoride, vinyl chloride or vinylidene chloride, and with a view to suppressing the cost of the fluorinated copolymer, it is preferably vinyl chloride or vinylidene chloride, more preferably vinyl chloride.

Monomer (d):

The monomer (d) is a monomer having no $R^f$ group and having a crosslinkable functional group.

By having structural units based on the monomer (d), the water repellency and the alcohol repellency will further be improved.

The crosslinkable functional group is preferably a functional group having at least one bond selected from a covalent bond, an ionic bond and a hydrogen bond, or a functional group capable of forming a crosslinked structure by an interaction of such a bond. Otherwise, a compound having an active organic group or an element such as hydrogen or halogen in its molecule may be used.

Such a functional group is preferably a hydroxy group, an isocyanate group, a blocked isocyanate group, an alkoxysilyl group, an amino group, an alkoxymethylamide group, a silanol group, an ammonium group, an amide group, an epoxy group, an oxazoline group, a carboxy group, an alkenyl group, a sulfonic acid group or the like, particularly preferably a hydroxy group, a blocked isocyanate group, an amino group or an epoxy group.

The monomer (d) is preferably a (meth)acrylate, an acrylamide, a vinyl ether or a vinyl ester.

The monomer (d) may, for example, be the following compounds.

2-Isocyanateethyl(meth)acrylate, 3-isocyanatepropyl(meth)acrylate, 4-isocyanatebutyl(meth)acrylate, a 2-butanoneoxime adduct of 2-isocyanateethyl(meth)acrylate, a pyrazole adduct of 2-isocyanateethyl(meth)acrylate, a 3,5-dimethylpyrazole adduct of 2-isocyanateethyl(meth)acrylate, a 3-methylpyrazole adduct of 2-isocyanateethyl(meth)acrylate, an ε-caprolactam adduct of 2-isocyanateethyl(meth)acrylate, a 2-butanoneoxime adduct of 3-isocyanatepropyl(meth)acrylate, a pyrazole adduct of 3-isocyanatepropyl(meth)acrylate.

A 3,5-dimethylpyrazole adduct of 3-isocyanatepropyl(meth)acrylate, a 3-methylpyrazole adduct of 3-isocyanatepropyl(meth)acrylate, an ε-caprolactam adduct of 3-isocyanatepropyl(meth)acrylate, a 2-butanoneoxime adduct of 4-isocyanatebutyl(meth)acrylate, a pyrazole adduct of 4-isocyanatebutyl(meth)acrylate, a 3,5-dimethylpyrazole adduct of 4-isocyanatebutyl(meth)acrylate, a 3-methylpyrazole adduct of 4-isocyanatebutyl(meth)acrylate, an ε-caprolactam adduct of 4-isocyanatebutyl(meth)acrylate.

Methoxymethyl(meth)acrylamide, ethoxymethyl(meth)acrylamide, butoxymethyl(meth)acrylamide, diacetone acrylamide, γ-methacryloyloxypropyl trimethoxysilane, trimethoxy vinyl silane, vinyl trimethoxysilane, dimethylaminoethyl(meth)acrylate, diethylaminoethyl(meth)acrylate, dimethylaminopropyl(meth)acrylate, (meth)acryloylmorpholine, (meth)acryloyloxyethyl trimethylammonium chloride, (meth)acryloyloxypropyl trimethylammonium chloride, (meth)acrylamideethyl trimethylammonium chloride, (meth)acrylamidepropyl trimethylammonium chloride.

t-butyl(meth)acrylamide sulfonic acid, (meth)acrylamide, N-methyl(meth)acrylamide, N-methylol(meth)acrylamide, N-butoxymethyl(meth)acrylamide, diacetone(meth)acrylamide, glycidyl(meth)acrylate, 2-hydroxyethyl(meth)acrylate, 2-hydroxypropyl(meth)acrylate, 4-hydroxybutyl(meth)acrylate, 3-chloro-2-hydroxypropyl methacrylate, polyoxyalkylene glycol mono(meth)acrylate, polyalkylene glycol di(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline, a polycaprolactone ester of 2-vinyl-4-methyl-(2-vinyloxazoline)hydroxyethyl (meth)acrylate.

Tri(meth)allyl isocyanurate (T(M)AIC manufactured by Nippon Kasei Chemical Co., Ltd.), triallyl cyanurate (TAC manufactured by Nippon Kasei Chemical Co., Ltd.), phenylglycidylethyl acrylate tolylene diisocyanate (AT-600 manufactured by KYOEISHA CHEMICAL Co., Ltd.), 3-(methylethylketoxime)isocyanatemethyl-3,5,5-trimethyl-cyclohexyl(2-hydroxyethyl methacrylate)cyanate (TECHCOAT HE-6P manufactured by Kyoken Kasei), a polycaprolactone ester of hydroxyethyl(meth)acrylate (PLACCEL FA, FM series manufactured by Daicel Chemical Industries, Ltd.).

Vinyl momochloroacetate, 2-chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, 1,6-hexanediol monovinyl ether, 1,4-cyclohexanedimethanol monovinyl ether, diethylene glycol monovinyl ether, triethylene glycol monovinyl ether, dipropylene glycol monovinyl ether, vinyl glycidyl ether, 2-aminoethyl vinyl ether, 3-aminopropyl vinyl ether, 2-aminobutyl vinyl ether, allyl vinyl ether, 1,4-butanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether.

The monomer (d) is preferably a compound having an amide group or a hydroxy group from the viewpoint of the water repellency and the alcohol repellency. Further, by having an amide group, a hydroxy group or the like which is a hydrophilic group as the monomer (d), the emulsion of the fluorinated copolymer will be stabilized. By the emulsion of the fluorinated copolymer being stabilized, the hydrophobic substrate will be uniformly treated, and the water repellency and the alcohol repellency will efficiently be obtained.

The monomer (d) is specifically preferably a polyalkylene glycol mono(meth)acrylate, N-methylol(meth)acrylamide or 2-hydroxyethyl(meth)acrylate.

Monomer (e):

The monomer (e) is a monomer other than the monomers (a), (b), (c) and (d). The monomer (e) may be any monomer which will not impair the effects of the present invention and may, for example, be a (meth)acrylate other than the monomers (a), (b), (c) and (d), an acrylamide, a vinyl ether or a vinyl ester. Here, a monomer having a $R^F$ group having at least 8 carbon atoms and a monomer having an alkyl group having at least 8 carbon atoms are excluded.

As the combination of the structural units based on the monomers, from the viewpoint of the water repellency and the alcohol repellency, preferred is a combination of structural units based on the monomer (a): a (meth)acrylate having a $C_{4-6}$ $R^F$ group, structural units based on the monomer (b): a (meth)acrylate having a $C_{1-4}$ alkyl group, structural units based on the monomer (c): vinyl chloride and structural units based on the monomer (d).

The proportion of the structural units based on the monomer (a) is preferably from 50 to 90 mass %, more preferably from 55 to 80 mass %, particularly preferably from 60 to 70 mass %, of the structural units (100 mass %) based on all the monomers, from the viewpoint of the water repellency and the alcohol repellency.

The proportion of the structural units based on the monomer (b) is preferably from 5 to 45 mass %, more preferably from 5 to 30 mass %, particularly preferably from 5 to 20 mass % of the structural units (100 mass %) based on all the monomers, from the viewpoint of the water repellency and the alcohol repellency.

The proportion of the structural units based on the monomer (c) is from 1 to 45 mass %, more preferably from 5 to 40 mass %, particularly preferably from 10 to 35 mass % of all the structural units (100 mass %) based on all the monomers, from the viewpoint of the adhesion to a substrate and the cost of the fluorinated copolymer.

The proportion of the structural units based on the monomer (d) is preferably from 0 to 10 mass % of the structural units (100 mass %) based on all the monomers, and from the viewpoint of the water repellency and the alcohol repellency, it is more preferably from 1 to 8 mass %, particularly preferably from 1 to 5 mass %.

The proportion of the structural units based on the monomer (e) is preferably from 0 to 20 mass %, more preferably from 0 to 10 mass % of the structural units (100 mass %) based on all the monomers.

In the present invention, the proportion of the structural units based on a monomer is obtained by the NMR (nuclear magnetic resonance) analysis and the elemental analysis. In a case where it can not be obtained by the NMR analysis and the elemental analysis, it may be calculated based on the charged amount of the monomer at the time of production of a water repellent composition.

The mass average molecular weight (Mw) of the fluorinated copolymer is preferably from 5,000 to 100,000, more preferably from 10,000 to 100,000. When the mass average molecular weight (Mw) of the fluorinated copolymer is at least 5,000, good water repellency and alcohol repellency will be obtained. When the mass average molecular weight (Mw) of the fluorinated copolymer is at most 100,000, good film-forming property will be obtained and as a result, sufficient water repellency and alcohol repellency will be obtained.

The mass average molecular weight (Mw) of the fluorinated copolymer is a molecular weight calculated as polymethyl methacrylate, as measured by gel permeation chromatography (GPC).

(Medium)

The medium may be water or an organic solvent (such as an alcohol, a glycol, a glycol ether, a halogenated compound, a hydrocarbon, a ketone, an ester, an ether, a nitrogen compound or a sulfur compound), and is preferably water alone or a mixed medium containing water. The organic solvent (polymerization assisting solvent) to be used in combination with water is particularly preferably a glycol organic solvent (such as dipropylene glycol or 3-methoxy-3-methyl-1-butanol) or a glycol ether type organic solvent (such as dipropylene glycol monomethyl ether).

The medium may be used alone or in combination of two or more.

(Surfactant)

The surfactant may, for example, be an anionic surfactant, a nonionic surfactant, a cationic surfactant or an amphoteric surfactant.

As the surfactant, a known one may be used.

The surfactant may be used alone or in combination of two or more.

The amount of the surfactant is preferably from 1 to 10 parts by mass, more preferably from 1 to 7 parts by mass based on the fluorinated copolymer (100 parts by mass).

(Additives)

As the additives, various known additives for a water repellent composition may be mentioned.

(Method for Producing Water Repellent Composition)

The water repellent composition of the present invention is produced by a method of polymerizing a monomer mixture comprising the monomers (a), (b) and (c) and further containing the monomer (d) and the monomer (e) as the case requires, in a medium in the presence of a surfactant and a polymerization initiator to obtain an emulsion of a fluorinated copolymer, and adding another medium, another surfactant and additives to the emulsion as the case requires.

The polymerization method may, for example, be an emulsion polymerization method, a dispersion polymerization method or a suspension polymerization method, and emulsion polymerization is preferred. Further, it may be polymerization all at once or multistage polymerization.

With a view to improving the yield of the fluorinated copolymer, it is preferred to pre-emulsify the mixture comprising the monomers, the surfactant and the medium, prior to the emulsion polymerization. For example the mixture comprising the monomers, the surfactant and the medium is mixed and dispersed by a homomixer or a high pressure emulsifier.

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer mixture.

At the time of polymerization of the monomer mixture, a molecular weight-controlling agent may be employed. The molecular weight-controlling agent is preferably an aromatic compound, a mercapto alcohol or a mercaptan, particularly preferably an alkylmercaptan. The molecular weight-controlling agent may, for example, be mercaptoethanol, n-octylmercaptan, n-dodecylmercaptan, t-dodecylmercaptan, stearylmercaptan or a-methylstyrene dimer ($CH_2$=C(Ph)$CH_2C(CH_3)_2$Ph (wherein Ph is a phenyl group)).

The amount of the molecular weight-controlling agent is preferably from 0 to 5 parts by mass, more preferably from 0 to 3 parts by mass, per 100 parts by mass of the monomer mixture.

Otherwise, the monomer mixture may be polymerized in the presence of a polyfunctional mercapto compound such as diethylene glycol bis(3-mercaptobutyrate), pentaerythritol tetrakis(3-mercaptobutyrate), 2,4,6-trimercaptotriazine or 1,3,5-tris(3-mercaptobutyloxyethyl)-1,3,5-triazine-2,4,6 (1H,3H,5H)-trione.

The proportions (mass %) of the charged amounts of the respective monomers in the monomer mixture to be used for polymerization are as follows.

The proportion of the monomer (a) is from 50 to 90 mass %, more preferably from 55 to 80 mass %, particularly preferably from 60 to 70 mass % of the monomer mixture (100 mass %) from the viewpoint of the water repellency and the alcohol repellency.

The proportion of the monomer (b) is from 5 to 45 mass %, more preferably from 5 to 30 mass %, particularly preferably from 5 to 20 mass % of the monomer mixture (100 mass %) from the viewpoint of the water repellency and the alcohol repellency.

The proportion of the monomer (c) is from 1 to 45 mass %, more preferably from 5 to 40 mass %, particularly preferably from 10 to 35 mass % of the monomer mixture (100 mass %) from the viewpoint of the adhesion to a substrate and the cost of the fluorinated copolymer.

The proportion of the monomer (d) is preferably from 0 to 10 mass % of the monomer mixture (100 mass %), and from the viewpoint of the water repellency and the alcohol repellency, it is more preferably from 1 to 8 mass %, particularly preferably from 1 to 5 mass %.

The proportion of the monomer (e) is preferably from 0 to 20 mass %, more preferably from 0 to 10 mass % of the monomer mixture (100 mass %).

In the water repellent composition of the present invention, it is preferred that the fluorinated copolymer is dispersed in the form of particles in the medium. The average particle size of the fluorinated copolymer is preferably from 50 to 1,000 nm, more preferably from 50 to 200 nm. When the average particle size is at least 50 nm, it will be unnecessary to use a surfactant in a large amount. When the average particle size is at most 200 nm, good film forming property will be obtained and as a result, sufficient water repellency and alcohol repellency will be obtained.

The average particle size of the fluorinated copolymer can be measured by e.g. a dynamic light-scattering apparatus or an electron microscope.

Immediately after the production, the solid content concentration of the water repellent composition is preferably from 20 to 40 mass %, more preferably from 35 to 40 mass % based on the water repellent composition (100 mass %). Here, the solid content concentration is a concentration including a surfactant and additives in addition to the fluorinated copolymer.

The solid content concentration of the water repellent composition is calculated from the mass of the water repellent composition before heating and the mass after drying for 4 hours by a counter current canal dryer at 120° C.

(Functional Effect)

The water repellent composition of the present invention, which comprises a fluorinated copolymer having structural units based on a monomer (b) having a short chain alkyl group and having no structural units based on a monomer having an alkyl group having at least 8 carbon atoms, will not inhibit the antistatic property imparted to a hydrophobic substrate by an antistatic agent. The water repellency and the alcohol repellency which have been compensated by a long chain alkyl group having at least 8 carbon atoms are maintained to be at satisfactory levels by adjusting the proportion of the structural units based on the monomer (a) to be at least 50 mass % of the structural units (100 mass %) based on all the monomers.

Further, of the water repellent composition of the present invention, which comprises a fluorinated copolymer having structural units based on the monomer (a) and structural units based on the monomer (b) and having no structural units based on a monomer having an $R^F$ group having at least 8 carbon atoms, the environmental impact can be suppressed to be low. Specifically, the content (content in a case where the solid content concentration is 20%) of perfluorooctanoic acid (PFOA) and perfluorooctanesulfonic acid (PFOS), and their precursors and analogs, of which the effects on the environment are pointed out, can be reduced to a level of not higher than the detection limit as an analytical value of LC-MS/MS (liquid chromatography/mass spectrometry) by the method disclosed in WO2009/081822.

<Hydrophobic Substrate Treating Agent Composition>

The hydrophobic substrate treating agent composition of the present invention comprises the water repellent composition of the present invention, a penetrant and an antistatic agent.

The hydrophobic substrate treating agent composition of the present invention is prepared by diluting the water repellent composition of the present invention with a medium for dilution as the case requires, and blending the penetrant and the antistatic agent and as the case requires, other agents used in combination.

The solid content concentration of the water repellent composition after dilution is preferably from 0.2 to 5 mass %, more preferably from 0.3 to 4 mass % of the water repellent composition (100 mass %) after dilution.

The medium for dilution may be water or an organic solvent, and is preferably water alone or a mixed medium containing water.

By using the penetrant, the water repellent composition of the present invention can penetrate into the hydrophobic substrate.

The penetrant may, for example, be an alcohol, an anionic surfactant, a nonionic surfactant, a cationic surfactant or an amphoteric surfactant, and specifically, it may, for example, be an alcohol having a $C_{1-10}$ alkyl group, a polyoxyethylene alkyl ether, or NRW-200 (manufactured by Mitsubishi International PolymerTrade Corporation). The penetrant may be used alone or in combination of two or more.

The concentration of the penetrant is preferably from 0.01 to 1.0 mass % in the hydrophobic substrate treating agent composition (100 mass %), and with a view to satisfying both the penetration property into the hydrophobic substrate, and the water repellency and the alcohol repellency, it is more preferably from 0.1 to 0.5 mass %.

The antistatic agent may, for example, be an anionic surfactant, a nonionic surfactant, a cationic surfactant or an amphoteric surfactant. Specifically, the anionic surfactant may be a phosphate compound such as ZELEC TY (manufactured by Stephan Company) or AS-300 (manufactured by Mitsubishi International Polymer Trade Corporation) as a metal butyl phosphate. The nonionic surfactant may be a polyoxyethylene compound, the cationic surfactant may, for example, be an alkyl ammonium chloride, and the amphoteric surfactant may, for example, be an amide alkyl betaine compound.

The concentration of the antistatic agent is preferably from 0.01 to 1.0 mass % in the hydrophobic substrate treating agent composition (100 mass %), and with a view to satisfying both the effects of the antistatic agent, and the water repellency and the alcohol repellency, it is more preferably from 0.1 to 0.5 mass %.

Other agents to be used in combination may, for example, be a pH adjusting agent, a flame retardant, a softening agent, an antislip agent, an anti-fraying agent, an anticrease agent or a stain proofing agent.

The hydrophobic substrate treating agent composition of the present invention, which comprises an antistatic agent, and the water repellent composition of the present invention capable of imparting sufficient water repellency and alcohol repellency to a hydrophobic substrate without inhibiting the antistatic property imparted to the hydrophobic substrate by the antistatic agent, and presenting a low environmental impact, can impart both sufficient antistatic property and sufficient water repellency and alcohol repellency to the hydrophobic substrate. Further, it presents a low environmental impact.

<Article>

The article of the present invention comprises a hydrophobic substrate treated with the hydrophobic substrate treating agent composition of the present invention.

The material of the hydrophobic substrate may, for example, be a polyolefin (such as polypropylene or polyethylene), polyvinyl chloride, nylon, polyester or polystyrene.

The form of the hydrophobic substrate may, for example, be polyolefin nonwoven fabric (such as polypropylene nonwoven fabric), polyethylene nonwoven fabric or polypropylene and polyethylene blend nonwoven fabric), nylon nonwoven fabric or polyester nonwoven fabric, and is preferably polypropylene nonwoven fabric for medical gowns.

The treating method may, for example, be a method of immersing the hydrophobic substrate in the hydrophobic substrate treating agent composition of the present invention, followed by drying; a method of applying the hydrophobic substrate treating agent composition of the present invention to the surface of the hydrophobic substrate by foam processing, followed by drying; a method of applying the hydrophobic substrate treating agent composition of the present invention to the surface of the hydrophobic substrate by roll coating, blade coating or the like, followed by drying; or a method of applying the hydrophobic substrate treating agent composition of the present invention to the surface of the hydrophobic substrate by spraying, followed by drying.

The article of the present invention, which is obtained by treating a hydrophobic substrate with the hydrophobic substrate treating agent composition of the present invention, has sufficient antistatic property, water repellency and alcohol repellency and presents a low environmental impact.

EXAMPLES

Now, the present invention will be described in detail with reference to Examples, but it should be understood that the present invention is by no means thereby restricted.

Examples 1 to 6 are Examples of the present invention, and Examples 7 to 10 are Comparative Examples.

<Physical Properties of Fluorinated Copolymer>

With respect to a fluorinated copolymer recovered by the following recovery method, its molecular weight was measured.

(Recovery Method)

6 g of an emulsion was dropped into 60 g of 2-propanol (hereinafter referred to as IPA), followed by stirring to precipitate solid. After carrying out centrifugal separation at 3,000 rpm for 5 minutes, the obtained solid was decanted. 12 g of IPA was again added, followed by thorough stirring. After carrying out centrifugal separation at 3,000 rpm for 5 minutes, the obtained solid was separated from the supernatant, followed by vacuum drying at 35° C. overnight to obtain a copolymer.

(Molecular Weight)

The recovered fluorinated copolymer was dissolved in a mixed solvent of a fluorinated solvent (manufactured by Asahi Glass Company, Limited, AK-225)/tetrahydrofuran (hereinafter referred to as THF)=6/4 (volume ratio) to obtain a 1 mass % solution, which was passed through a 0.2 μm filter to obtain a sample for analysis. With respect to the sample, the mass average molecular weight (Mw) was measured. The conditions for the measurement were as follows.

Apparatus: HLC-8220GPC manufactured by TOSOH CORPORATION

Column: one having MIXED-C and 100A manufactured by Polymer Laboratories connected in series
  Measurement temperature: 37° C.
  Injected amount: 50 μL
  Outflow rate: 1 mL (milliliter)/min
  Standard sample: EasiCalPM-2 manufactured by Polymer Laboratories
  Eluent: mixed solvent of a fluorinated solvent (manufactured by Asahi Glass Company, Limited, AK-225)/THF=6/4 (volume ratio)
(Average Particle Size)
The average particle size of the fluorinated copolymer in the emulsion was measured by using a light scattering apparatus (manufactured by Otsuka Electronics Co., Ltd., FPAR-1000).
<Evaluation of Physical Properties>
(Water Pressure Resistance)
In accordance with Worldwide Strategic Partners (hereinafter referred to as WSP) 80.1, the pressure under which water droplets at three points passed or the pressure at which an evaluation sample was broken, under conditions of a pressure-increasing rate of 60 mbar/min, was regarded as the water pressure resistance.
(Alcohol Repellency)
In accordance with WSP80.8, a mixed solvent of isopropyl alcohol/water in a mixture ratio as identified in Table 1 was dropped on an evaluation sample, and the maximum number in Table 1 of the mixed solvent which did not penetrate 5 minutes was regarded as the evaluated value.

TABLE 1

| Alcohol repellency | Isopropyl alcohol vol % | Deionized water vol % |
|---|---|---|
| 0 | 0 | 100 |
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | 0 |

(Surface Electric Resistance)
In accordance with WSP40.1, a load voltage (100 V) was applied to an evaluation sample, and the surface electric resistance 30 minutes later was measured.
(Abbreviations)
Monomer (a):
  C6FMA: $C_6F_{13}C_2H_4OC(O)C(CH_3)\!=\!CH_2$
Monomer (b):
  BA: n-butyl acrylate (manufactured by KANTO CHEMICAL CO., INC.)
  BMA: n-butyl methacrylate (manufactured by KANTO CHEMICAL CO., INC.)
Monomer (b'):
  LA: lauryl acrylate (LA manufactured by OSAKA ORGANIC CHEMICAL INDUSTRY LTD.)
  STA: stearyl acrylate (STA manufactured by NOF Corporation)
  BeA: behenyl acrylate (BLEMMER VA manufactured by NOF Corporation)
Monomer (c):
  VCM: vinyl chloride
Monomer (d):
  PE-350: polyethylene glycol monomethacrylate (BLEMMER PE-350 manufactured by NOF Corporation, added moles of ethylene oxide: 8, containing about 10 mass % of polyethylene glycol dimethacrylate)
  N-MAM: N-methylolacrylamide (N-MAM manufactured by KASANO KOSAN CO., LTD.)
Surfactant:
  Aq-18: monostearyltrimethylammonium chloride (ARQUAD 18-63 manufactured by LION AKZO Co., Ltd.)
  P-204: ethylene oxide propylene oxide polymerized product (PRONONE 204 manufactured by NOF Corporation, proportion of ethylene oxide: 40 mass %)
  AM3130N: coconut oil fatty acid amidepropyl betaine liquid (NIKKOL AM-3130N manufactured by Nihon Surfactant Kogyo K.K.)
  E430: polyoxyethylene oleyl ether (EMULGEN430 manufactured by KAO Corporation, added moles of ethylene oxide: 30)
Molecular Weight-Controlling Agent:
  DoSH: n-dodecyl mercaptan
Polymerization Initiator:
  VA-061: 2,2'-azobis[2-(2-imidazolin-2-yl)propane] (VA-061 manufactured by Wako Pure Chemical Industries, Ltd.)
Medium:
  Water: deionized water
Polymerization Assisting Solvent:
  DPG: dipropylene glycol
  Solfit: 3-methoxy-3-methyl-1-butanol (manufactured by KURARAY CO., LTD.)
  DPM: dipropylene glycol monomethyl ether (ARCOSOLV DPM manufactured by Kyowa Hakko Chemical Co., Ltd.)

[Example 1]

Into a glass autoclave, 209.5 g of C6FMA, 34.9 g of BMA, 6.98 g of PE-350, 3.1 g of P-204, 3.1 g of AM3130N, 10.8 g of E-430, 434.2 g of water, 104.8 g of DPG and 3.5 g of DoSH were introduced, then heated at 60° C. for 60 minutes, pretreated at 10 MPa by means of a high pressure emulsifying machine (manufactured by NIPPON SEIKI CO., LTD.) and then treated in full scale at 40 MPa to obtain an emulsified liquid.
714.8 g of the obtained emulsified liquid was put into a stainless steel reactor, and 1.4 g of VA-061 was added, followed by cooling to a temperature of at most 30° C. The vapor phase was substituted by nitrogen, 78.2 g of VCM was introduced, and a polymerization reaction was carried out at 55° C. for one hour and at 60° C. for 10 hours with stirring to obtain a water repellent composition comprising an emulsion having a solid content concentration of 34.0 mass %.

[Example 2]

A water repellent composition comprising an emulsion was obtained in the same manner as in Example 1 except that the amounts of PE-350 and VCM were changed to 0 g and 83.0 g, respectively.

[Example 3]

A water repellent composition comprising an emulsion was obtained in the same manner as in Example 1 except that the amounts of C6FMA, BMA and VCM were changed to 244.4 g, 69.8 g and 22.4 g, respectively.

[Example 4]

A water repellent composition comprising an emulsion was obtained in the same manner as in Example 1 except that PE-350 was changed to N-MAM.

[Example 5]

A water repellent composition comprising an emulsion was obtained in the same manner as in Example 1 except that BMA was changed to BA.

[Example 6]

A water repellent composition comprising an emulsion was obtained in the same manner as in Example 1 except that AM3130N was changed to Aq-18.

[Example 7]

A water repellent composition comprising an emulsion was obtained in the same manner as in Example 1 except that the amounts of C6FMA and BMA were changed to 139.7 g and 104.8 g, respectively.

[Example 8]

A water repellent composition comprising an emulsion was obtained in the same manner as in Example 1 except that BMA was changed to LA.

[Example 9]

A water repellent composition comprising an emulsion was obtained in the same manner as in Example 1 except that BMA was changed to STA.

[Example 10]

A water repellent composition comprising an emulsion was obtained in the same manner as in Example 1 except that BMA was changed to BeA.

[Evaluation]

The water repellent composition was diluted with water so that the solid content concentration became 0.25 mass %, a penetrant (NRW-200 manufactured by Mitsubishi International PolymerTrade Corporation) was added so that the concentration became 0.25 mass %, and an antistatic agent (AS-300 manufactured by Mitsubishi International PolymerTrade Corporation) was added so that the concentration became 0.3 mass % to obtain a hydrophobic substrate treating agent composition.

A polypropylene nonwoven fabric (basis weight: 63 g/m$^2$) was immersed in the hydrophobic substrate treating agent composition, and the surplus liquid was removed by a mangle. The standard pickup was adjusted to be 140%. The polypropylene nonwoven fabric was subjected to heat treatment at 125° C. for 4 minutes to obtain an evaluation sample. The water repellency (water pressure resistance), the alcohol repellency and the surface electric resistance (antistatic property) of the sample were evaluated.

The results are shown in Tables 2 and 3.

TABLE 2

| Blend ratio (parts by mass) | | Example 1 | Example 2 | Example 3 | Example 4 | Example 5 |
|---|---|---|---|---|---|---|
| Monomer (a) | C6FMA | 60 | 60 | 70 | 60 | 60 |
| Monomer (b) | BA | | | | | 10 |
| | BMA | 10 | 10 | 20 | 10 | |
| Monomer (b') | LA | | | | | |
| | STA | | | | | |
| | BeA | | | | | |
| Monomer (c) | VCM | 28 | 30 | 8 | 28 | 28 |
| Monomer (d) | PE-350 | 2 | | 2 | | 2 |
| | N-MAM | | | | 2 | |
| Surfactant | P-204 | 0.9 | 0.9 | 0.9 | 0.9 | 0.9 |
| | AM3130N | 0.9 | 0.9 | 0.9 | 0.9 | 0.9 |
| | Aq-18 | | | | | |
| | E430 | 3 | 3 | 3 | 3 | 3 |
| Mass average molecular weight (Mw) | | 52,082 | 55,444 | 56,119 | 52,592 | 52,606 |
| Average particle size (nm) | | 102 | 107 | 111 | 110 | 110 |
| Water pressure resistance (mmH$_2$O) | | 673 | 571 | 643 | 699 | 627 |
| Alcohol repellency | | 8 | 8 | 7-8 | 9 | 8 |
| Surface electric resistance (GΩ) | | <10$^2$ | <10$^2$ | <10$^3$ | <10$^3$ | <10$^2$ |

TABLE 3

| Blend ratio (parts by mass) | | Example 6 | Example 7 | Example 8 | Example 9 | Example 10 |
|---|---|---|---|---|---|---|
| Monomer (a) | C6FMA | 60 | 40 | 60 | 60 | 60 |
| Monomer (b) | BA | | | | | |
| | BMA | 10 | 30 | | | |
| Monomer (b') | LA | | | 10 | | |
| | STA | | | | 10 | |
| | BeA | | | | | 10 |
| Monomer (c) | VCM | 28 | 28 | 28 | 28 | 28 |
| Monomer (d) | PE-350 | 2 | 2 | 2 | 2 | 2 |
| | N-MAM | | | | | |

TABLE 3-continued

| Blend ratio (parts by mass) | | 6 | 7 | 8 | 9 | 10 |
|---|---|---|---|---|---|---|
| Surfactant | P-204 | 0.9 | 0.9 | 0.9 | 0.9 | 0.9 |
| | AM3130N | | 0.9 | 0.9 | 0.9 | 0.9 |
| | Aq-18 | 0.9 | | | | |
| | E430 | 3 | 3 | 3 | 3 | 3 |
| Mass average molecular weight (Mw) | | 52,361 | 57,491 | 61,812 | 58,148 | 60,954 |
| Average particle size (nm) | | 121 | 117 | 124 | 120 | 135 |
| Water pressure resistance (mmH$_2$O) | | 643 | 607 | 607 | 622 | 612 |
| Alcohol repellency | | 8 | 4 | 3 | 3 | 3 |
| Surface electric resistance (GΩ) | | <10$^3$ | <10$^2$ | <10$^3$ | <10$^4$ | <10$^4$ |

Industrial Applicability

The water repellent composition of the present invention presents a low environmental impact, and is capable of imparting water repellency and alcohol repellency to polypropylene nonwoven fabric to be used for medical gowns without inhibiting the antistatic property, and is thereby useful.

This application is a continuation of PCT Application No. PCT/JP2011/068078, filed on Aug. 8, 2011, which is based upon and claims the benefit of priority from Japanese Patent Application No. No. 2010-180244 filed on Aug. 11, 2010. The contents of those applications are incorporated herein by reference in its entirety.

What is claimed is:

1. A water repellent composition to be used for treatment of a hydrophobic substrate, which comprises
    a fluorinated copolymer comprising structural units based on the following monomer (a), structural units based on the following monomer (b) and structural units based on the following monomer (c), and a medium,
    wherein the proportion of the structural units based on the monomer (a) is from 50 to 90 mass % and the proportion of the structural units based on the monomer (b) is from 5 to 30 mass % of the structural units (100 mass %) based on all monomers present in the fluorinated copolymer:
    monomer (a): a compound represented by formula (1):

$$(Z-Y)_n X \quad (1)$$

wherein
    Z is a C$_{4-6}$ perfluoroalkyl group
    Y is a C$_{1-4}$ alkylene group,
    n is 1, and
    X is a group represented by formula (3-3):

wherein R is a hydrogen atom, a methyl group or a halogen atom;
    monomer (b): a (meth)acrylate having no polyfluoroalkyl group and having a C$_{1-6}$ alkyl group;
    monomer (c): vinyl chloride or vinylidene chloride.

2. The water repellent composition according to claim 1, wherein the fluorinated copolymer further comprises structural units based on the following monomer (d):
    monomer (d): a monomer having no polyfluoroalkyl group and having a crosslinkable functional group.

3. The water repellent composition according to claim 1, wherein the mass average molecular weight (Mw) of the fluorinated copolymer is from 5,000 to 100,000.

4. The water repellent composition according to claim 1, wherein from 55 to 90 mass % of the structural units of the fluorinated copolymer are units of monomer (a), relative to 100 mass % of all monomers present in the fluorinated copolymer.

5. The water repellent composition according to claim 1, wherein from 55 to 80 mass % of the structural units of the fluorinated copolymer are units of monomer (a), relative to 100 mass % of all monomers present in the fluorinated copolymer.

6. The water repellent composition according to claim 1, wherein from 60 to 70 mass % of the structural units of the fluorinated copolymer are units of monomer (a), relative to 100 mass % of all monomers present in the fluorinated copolymer.

7. The water repellent composition according to claim 1, wherein from 5 to 20 mass % of the structural units of the fluorinated copolymer are units of monomer (b), relative to 100 mass % of all monomers present in the fluorinated copolymer.

8. The water repellent composition according to claim 1, wherein monomer (b) is a linear (meth)acrylate having no polyfluoroalkyl group and having a C$_{1-6}$ alkyl group.

9. The water repellent composition according to claim 1, wherein monomer (c) is vinyl chloride.

10. The water repellent composition according to claim 1, wherein monomer (c) is vinylidene chloride.

11. The water repellent composition according to claim 1, wherein all units of monomer (a) are units of C$_6$F$_{13}$C$_2$H$_4$OC(O)C(CH$_3$)=CH$_2$.

12. A method for producing a water repellent composition according to claim 1, which comprises polymerizing a monomer mixture in a medium in the presence of a surfactant and a polymerization initiator,
    wherein said monomer mixture comprises monomers (a), (b), and (c).

13. The method for producing a water repellent composition according to claim 12, wherein the monomer mixture further comprises monomer (d):
    monomer (d): a monomer having no polyfluoroalkyl group and having a crosslinkable functional group.

* * * * *